(12) United States Patent
Chao et al.

(10) Patent No.: US 8,451,227 B2
(45) Date of Patent: May 28, 2013

(54) IMAGE PROCESSING METHOD OF OPTICAL NAVIGATOR AND OPTICAL NAVIGATOR USING THE SAME

(75) Inventors: Tzu Yi Chao, Hsin-Chu (TW); Hsin Chia Chen, Hsin-Chu (TW); Tzung Min Su, Hsin-Chu (TW)

(73) Assignee: Pixart Imaging Inc (TW)

( * ) Notice: Subject to any disclaimer, the term of this patent is extended or adjusted under 35 U.S.C. 154(b) by 727 days.

(21) Appl. No.: 12/561,788

(22) Filed: Sep. 17, 2009

(65) Prior Publication Data
US 2010/0103107 A1    Apr. 29, 2010

(30) Foreign Application Priority Data
Oct. 23, 2008 (TW) ................ 97140586 A

(51) Int. Cl.
*G06F 3/033* (2006.01)
(52) U.S. Cl.
USPC .................. 345/166; 345/175; 345/593
(58) Field of Classification Search
CPC ................................... G06F 3/033
USPC ........... 345/166, 593, 60, 207, 418; 382/128, 382/260; 348/229.1
See application file for complete search history.

(56) References Cited

U.S. PATENT DOCUMENTS

| | | | |
|---|---|---|---|
| 6,297,513 B1 | 10/2001 | Oliver et al. | |
| RE38,005 E * | 2/2003 | Schubert et al. | 345/418 |
| 8,305,370 B2 * | 11/2012 | Song et al. | 345/207 |
| 2004/0100565 A1 * | 5/2004 | Chen et al. | 348/229.1 |
| 2005/0063606 A1 * | 3/2005 | Kita | 382/260 |
| 2006/0033684 A1 * | 2/2006 | Lee et al. | 345/60 |
| 2007/0165925 A1 * | 7/2007 | Ahn et al. | 382/128 |
| 2008/0204438 A1 * | 8/2008 | Song et al. | 345/207 |
| 2009/0096807 A1 * | 4/2009 | Silverstein et al. | 345/593 |

* cited by examiner

*Primary Examiner* — Thuy Pardo
(74) *Attorney, Agent, or Firm* — Lowe Hauptman Ham & Berner, LLP

(57) ABSTRACT

An image processing method of a optical navigator includes the steps of: capturing a first image and calculating an average brightness of the first image; determining whether the average brightness is between a first threshold value and a second threshold value; when the average brightness is between the first and second threshold values, determining whether the first image is attenuated by an attenuation value; when the first image is not attenuated by the attenuation value, updating the attenuation value and a gain; attenuating the first image with the updated attenuation value and amplifying the attenuated first image with the gain; and comparing the attenuated and amplified first image with a reference image to obtain a displacement. The present invention further provides an optical navigator.

19 Claims, 4 Drawing Sheets

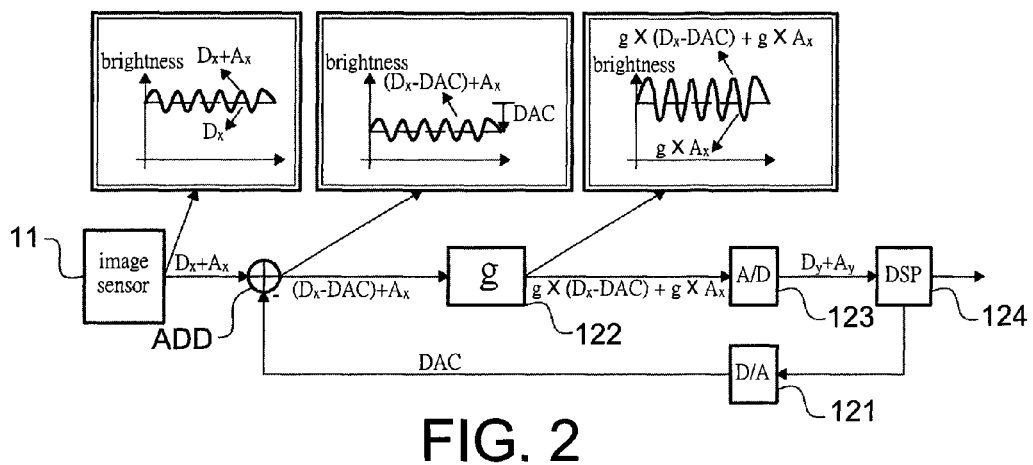
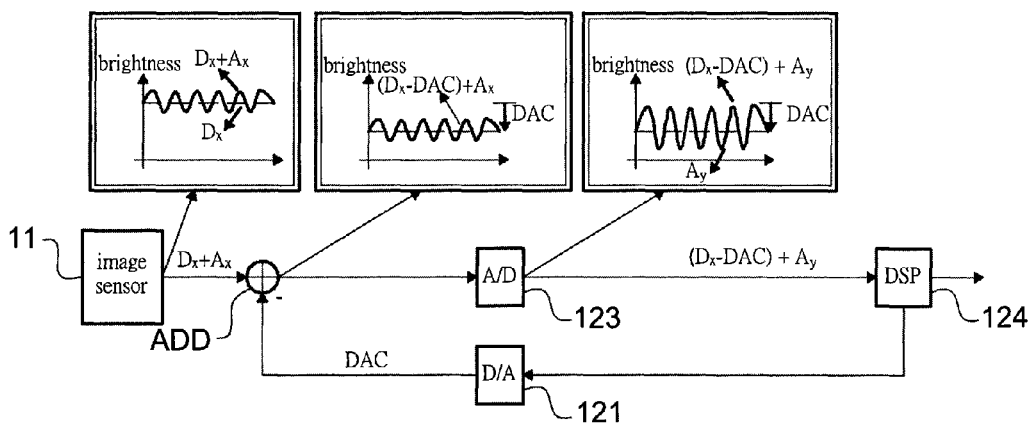

IMAGE PROCESSING METHOD OF OPTICAL NAVIGATOR AND OPTICAL NAVIGATOR USING THE SAME

CROSS REFERENCE TO RELATED APPLICATION

This application claims the priority benefit of Taiwan Patent Application Serial Number 097140586, filed on Oct. 23, 2008, the full disclosure of which is incorporated herein by reference.

BACKGROUND

1. Field of the Invention

This invention generally relates to an optical navigator and, more particularly, to an image processing method of an optical navigator and an optical navigator using the same.

2. Description of the Related Art

When the brightness of images captured by the image sensor of an optical navigator, e.g. a mouse, is not within a predetermined range, it is generally necessary to adjust an exposure of the optical navigator to allow the image sensor thereof to capture images having sufficient brightness. For example, U.S. Pat. No. 6,297,513 discloses "Exposure Servo for Optical Navigation over Micro-Textured Work Surface" that controls an exposure control parameter according to an average illumination of images captured by an optical navigation device. The control method includes the steps of: (a) initially varying the setting of the exposure control parameter until average illumination is approximately 50% of its maximum possible value; (b) retaining, if correlation data associated with navigation are satisfactory, the current exposure control parameter setting, otherwise further varying the exposure control parameter setting to obtain satisfactory correlation data; (c) storing the current average level of illumination; (d) navigating with the current exposure control parameter setting to obtain an amount of relative motion, wherein the navigation includes storing latest values of average illumination and the correlation data; and (e) adjusting the setting of the exposure control parameter.

However, the aforementioned control method varies the exposure control parameter only when the average illumination of images is not within a predetermine range so as to adjust the illumination of images of a work surface having different reflection intensities. When the average illumination of images fulfills the requirement, images captured by the optical navigation device will not be further processed, and therefore it is not able to effectively increase the dynamic processability of reflected images of a work surface.

Accordingly, it is necessary to further provide an image processing method of an optical navigator so as to increase the resolution of the image of a work surface having different reflection intensities and further to increase the dynamic processability of reflected images from the work surface.

SUMMARY

The present invention provides an image processing method of an optical navigator and an optical navigator using the same that processes images captured by an image sensor with an ADC unit in combination with an amplifier so as to increase the resolution of the image of a work surface having different reflection intensities and further to increase the dynamic processability of reflected images from the work surface.

The present invention provides an image processing method of an optical navigator and an optical navigator using the same that processes images captured by an image sensor with a non-linear analog-to-digital function so as to increase the resolution of the image of a work surface having different reflection intensities and further to increase the dynamic processability of reflected images from the work surface.

The present invention provides an image processing method of an optical navigator, and the optical navigator captures images with exposure parameters. The image processing method includes the steps of: capturing a first image and calculating an average brightness of the first image; determining whether the average brightness is between a first threshold value and a second threshold value; when the average brightness is not between the first and second threshold values, changing the exposure parameters of the optical navigator and comparing the first image with a reference image to obtain a displacement; when the average brightness is between the first and second threshold values, determining whether the first image is attenuated by an attenuation value; when the first image is attenuated by the attenuation value, comparing the first image with a reference image to obtain a displacement; when the first image is not attenuated by the attenuation value, updating the attenuation value and a gain, attenuating the first image by the updated attenuation value and amplifying the attenuated first image with the gain, comparing the attenuated and amplified first image with a reference image to obtain a displacement, and transmitting the displacement to an image display.

In the image processing method of an optical navigator of the present invention, the gain may be a linear gain or a non-linear gain, and the digitizing may be a linear digitizing process or a non-linear digitizing process.

According to another aspect of the present invention, there is provided an optical navigator including an image sensor, a DAC (digital-to-analog conversion) unit, an adding unit, an amplifier, an ADC (analog-to-digital conversion) unit and a digital signal processor. The image sensor is for capturing images of a work surface to form an analog image having an average brightness. The DAC unit is for generating an attenuation value. The adding unit is coupled to the image sensor and the DAC unit for attenuating the analog image with the attenuation value. The amplifier is for amplifying the attenuated analog image. The ADC unit is for digitizing the attenuated and amplified analog image. The digital signal processor is for comparing the digitized analog image with a reference image to form a displacement and for controlling the DAC unit to generate the attenuation value.

According to still yet another aspect of the present invention, there is provided an optical navigator including an image sensor, a DAC (digital-to-analog conversion) unit, an adding unit, a non-linear ADC (analog-to-digital conversion) unit and a digital signal processor. The image sensor is for capturing images of a work surface to form an analog image having an average brightness. The DAC unit is for generating an attenuation unit. The adding unit is coupled to the image sensor and the DAC unit for attenuating the analog image with the attenuation value. The non-linear ADC unit is for digitizing the attenuated analog image. The digital signal processor is for comparing the digitized analog image with a reference image to form a displacement and for controlling the DAC unit to generate the attenuation value.

In the optical navigator of the present invention, according to different applications, the ADC unit may be a linear ADC unit or a non-linear ADC unit, and the amplifier may have linear gain or non-linear gain so as to increase the resolution of the image of a work surface.

BRIEF DESCRIPTION OF THE DRAWINGS

Other objects, advantages, and novel features of the present invention will become more apparent from the following detailed description when taken in conjunction with the accompanying drawings.

FIG. 2 shows a schematic block diagram of the image processing method according to one embodiment of the present invention.

FIG. 2a shows a schematic diagram of the one-dimensional brightness distribution of an image captured by the image sensor shown in FIG. 2.

FIG. 2b shows a schematic diagram of the one-dimensional brightness distribution of an attenuated image shown in FIG. 2.

FIG. 2c shows a schematic diagram of the one-dimensional brightness distribution of an attenuated and amplified image shown in FIG. 2.

FIG. 3 shows a schematic block diagram of the image processing method according to another embodiment of the present invention.

FIG. 3a shows a schematic diagram of the one-dimensional brightness distribution of an image captured by the image sensor shown in FIG. 3.

FIG. 3b shows a schematic diagram of the one-dimensional brightness distribution of an attenuated image shown in FIG. 3.

FIG. 3c shows a schematic diagram of the one-dimensional brightness distribution of an image after the non-linear ADC unit shown in FIG. 3.

DETAILED DESCRIPTION OF THE EMBODIMENT

Figure 1:
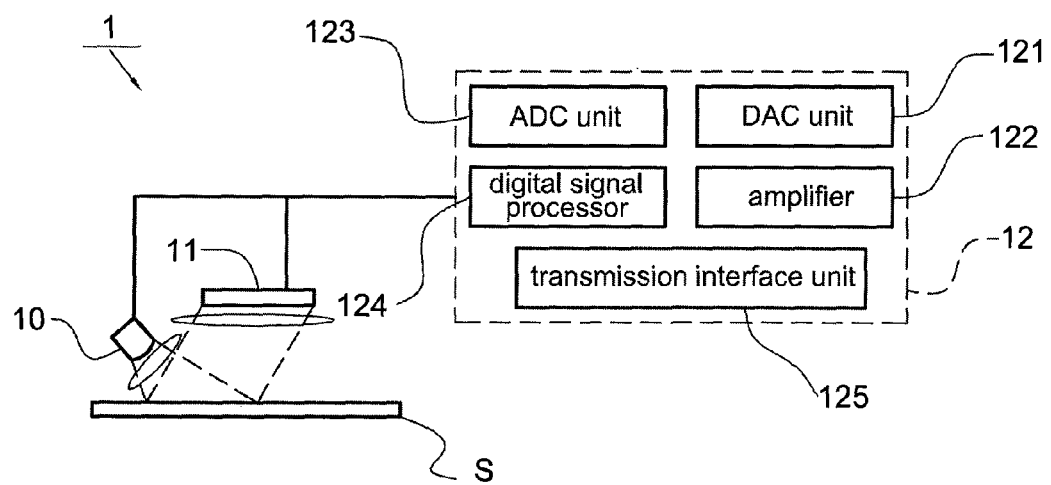
FIG. 1 shows a schematic block diagram of the optical navigator according to one embodiment of the present invention.

Please refer to FIG. 1, it shows a schematic diagram of the optical navigator 1 according to one embodiment of the present invention. The optical navigator 1 includes a light source 10, an image sensor 11 and an image processing unit 12. Embodiments of the light source 10 include a light emitting diode and a laser diode. The light source 10 is for lighting a work surface "S", e.g. the surface of a table or the surface of a mouse pad. Embodiments of the image sensor 11 include a charge-coupled device (CCD) image sensor and a complementary-metal-oxide semiconductor (CMOS) image sensor. The image sensor 11 is for sensing the reflected light from the work surface "S" to form a two-dimensional analog image. The two-dimensional analog image is an image composed of the brightness sensed by each pixel of the image sensor 11. The image processing unit 12 is coupled to the light source 10 and the image sensor 11 for processing images captured by the image sensor 11 and for controlling the lighting, e.g. the lighting frequency and illumination, of the light source 10. In this invention, the resolution of the image of the work surface "S" can be increased by further processing the images captured by the image sensor 11 with the image processing unit 12.

The image processing unit 12 includes a digital-to-analog conversion (DAC) unit 121, an amplifier 122, an analog-to-digital conversion (ADC) unit 123, a digital signal processor 124 and a transmission interface unit 125. The DAC unit 121 receives digital signals from the digital signal processor 124 to generate a direct-current (DC) attenuation value (referred as "DAC" herein). The attenuation value is used for attenuating the brightness of two-dimensional analog images captured by the image sensor 11 to maintain the brightness within a predetermined range (e.g. 0-255 gray level scale) in the following amplifying and digitizing steps. The amplifier 122 is for amplifying the two-dimensional analog image attenuated by the attenuation value (referred as attenuated analog image herein). The amplifier 122 may be a linear amplifier or a non-linear amplifier, and the amplifier 122 may be omitted depending on the type of the ADC unit 123. The ADC unit 123 may be a linear or a non-linear ADC unit, and is for converting the two-dimensional analog image, which may or may not be attenuated by the attenuation value and then be amplified, captured by the image sensor 11 to a digital value, for example a gray level value between 0-255. The digital signal processor 124 receives the gray level values of each pixel of the ADC unit 123 to form a two-dimensional digital image and accordingly to obtain a displacement, e.g. to obtain the displacement according to the correlation between the digital images at different time intervals. In addition, the digital signal processor 124 also controls the DAC unit 121 to generate an attenuation value, which is determined according to the images processed by the digital signal processor 124. The transmission interface unit 125 wirelessly or electrically transmits the displacement obtained by the digital signal processor 124 to an image display (not shown) so as to perform corresponding control.

Please refer to FIGS. 2, 2a to 2c, they show a schematic block diagram of the image processing method according to one embodiment of the present invention. FIGS. 2a to 2c show schematic diagrams of the one-dimensional brightness distribution of an image during different processing stages according to one embodiment. The image sensor 11 first captures a two-dimensional analog image of the work surface "S", wherein FIG. 2a shows the variation of the brightness $(D_x + A_x)$ of one row pixels in the two-dimensional analog image with respect to the transverse position of a sensing array (not shown) of the image sensor 11; $D_x$ is an average brightness and $A_x$ is a characteristic variation of the brightness. The brightness $(D_x + A_x)$ is attenuated by an attenuation value using an adding unit "ADD" (it also can be implemented by a subtractor) to become $(D_x - DAC) + A_x$ as shown in FIG. 2b, wherein the value of "DAC" is determined by the digital signal processor 124. Then the brightness $(D_x - DAC) + A_x$ of one row pixels in the attenuated two-dimensional analog image will be amplified by the amplifier 122, which has a gain "g", to become $g \times (D_x - DAC) + g \times A_x$ as shown in FIG. 2c, wherein $g \times A_x$ is the wavelet signal of the brightness variation. At last, the ADC unit 123 linearly or non-linearly converts the brightness distribution of one row pixels in the attenuated and amplified two-dimensional analog image to a digital value (digitizing process) and transmits the digital value to the digital signal processor 124. It should be understood that, the purpose of attenuating the brightness $(D_x + A_x)$ with the "DAC" is to maintain the brightness within a predetermined range in the following amplifying and digitizing processes. By comparing FIGS. 2b and 2c, it is known that after the brightness of one row pixels in the two-dimensional analog image is amplified, the peak-to-peak value of the characteristic variation of the brightness "$A_x$" is increased apparently and that will help to increase the image resolution of the digitized image. In addition, the gain of the amplifier 122 may be linear or non-linear. It will be appreciated that, although the brightness of one row pixels in the two-dimensional analog image is used to explain the present invention, it was not to limit the present invention. Actually, the brightness of all pixels in the two-dimensional analog image was processed by the above image processing method.

Figures 4A, 4B:
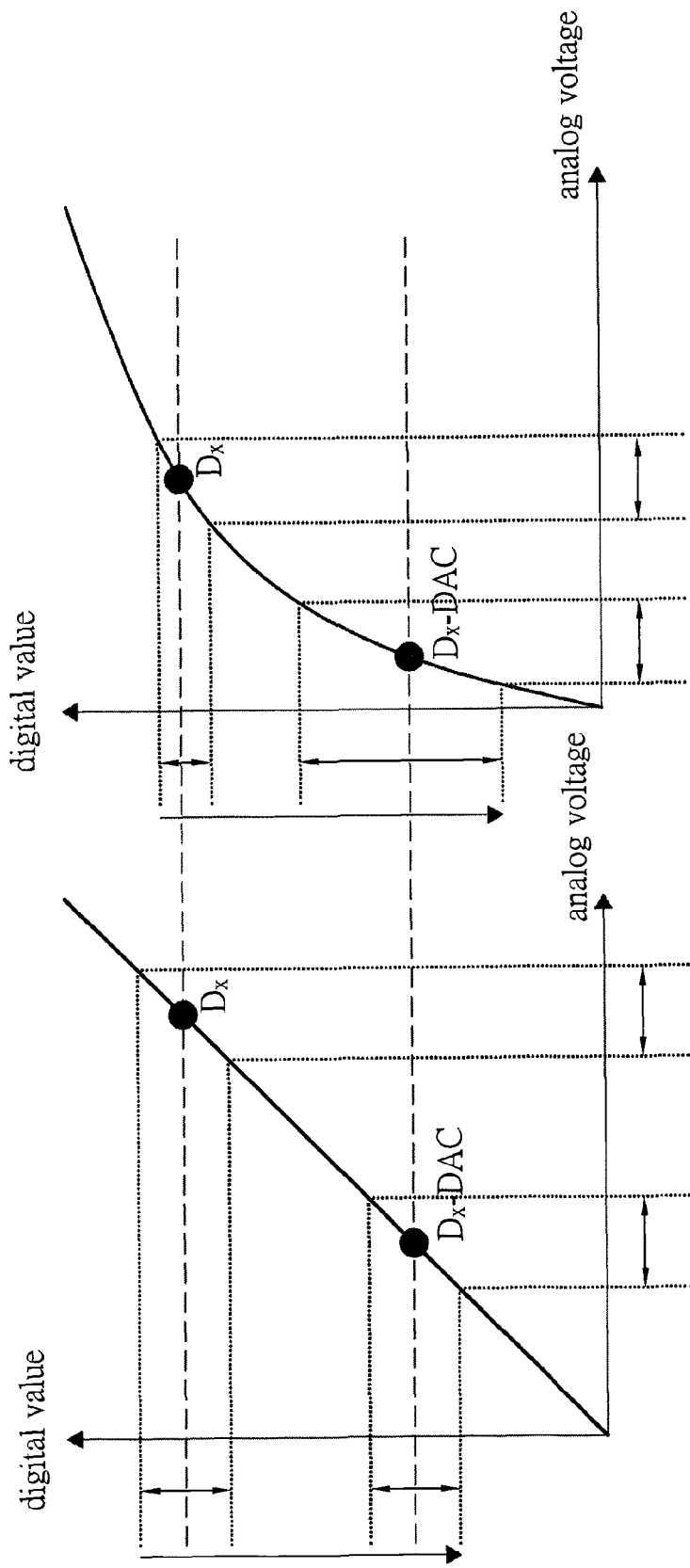
FIG. 4a shows a diagram illustrating the linear relationship between digital values and analog voltages.
FIG. 4b shows a diagram illustrating the non-linear relationship between digital values and analog voltages.

Please refer to FIGS. 4a and 4b, FIG. 4a shows the relationship between digital values and analog voltages in the digitizing process when the amplifier 122 or the ADC unit 123 is linear; FIG. 4b shows the relationship between digital values and analog voltages in the digitizing process when the amplifier 122 or the ADC unit 123 is non-linear. By comparing FIGS. 4a and 4b, it is known that, the same analog voltage variation will cause a larger variation in the digital value during non-linear amplifying and non-linear digitizing processes. That is, a higher resolution can be implemented.

Please refer to FIGS. 3, 3a to 3c, they show a schematic block diagram of the image processing method according to another embodiment of the present invention. The difference between FIG. 3 and FIG. 2 is that, a non-linear ADC unit 123 is used in FIG. 3 without using the amplifier 122. Similarly, the image sensor 11 first captures a two-dimensional analog image of the work surface "S" as shown in FIG. 3a. Then, the brightness ($D_x + A_x$) of one row pixels in the two-dimensional analog image is attenuated by an attenuation value "DAC" using an adding unit "ADD" to become ($D_x - DAC) + A_x$ as shown in FIG. 3b. At last, the non-linear ADC unit 123 non-linearly digitizes the two-dimensional analog image captured by the image sensor 11, as shown in FIG. 3c, and transmits the digitized image to the digital signal processor 124. The digital signal processor 124 determines a gain and an attenuation value that will be used in the next image captured by the image sensor 11 according a current processed image, and informs the DAC unit 121 to generate the attenuation value.

Figure 5:
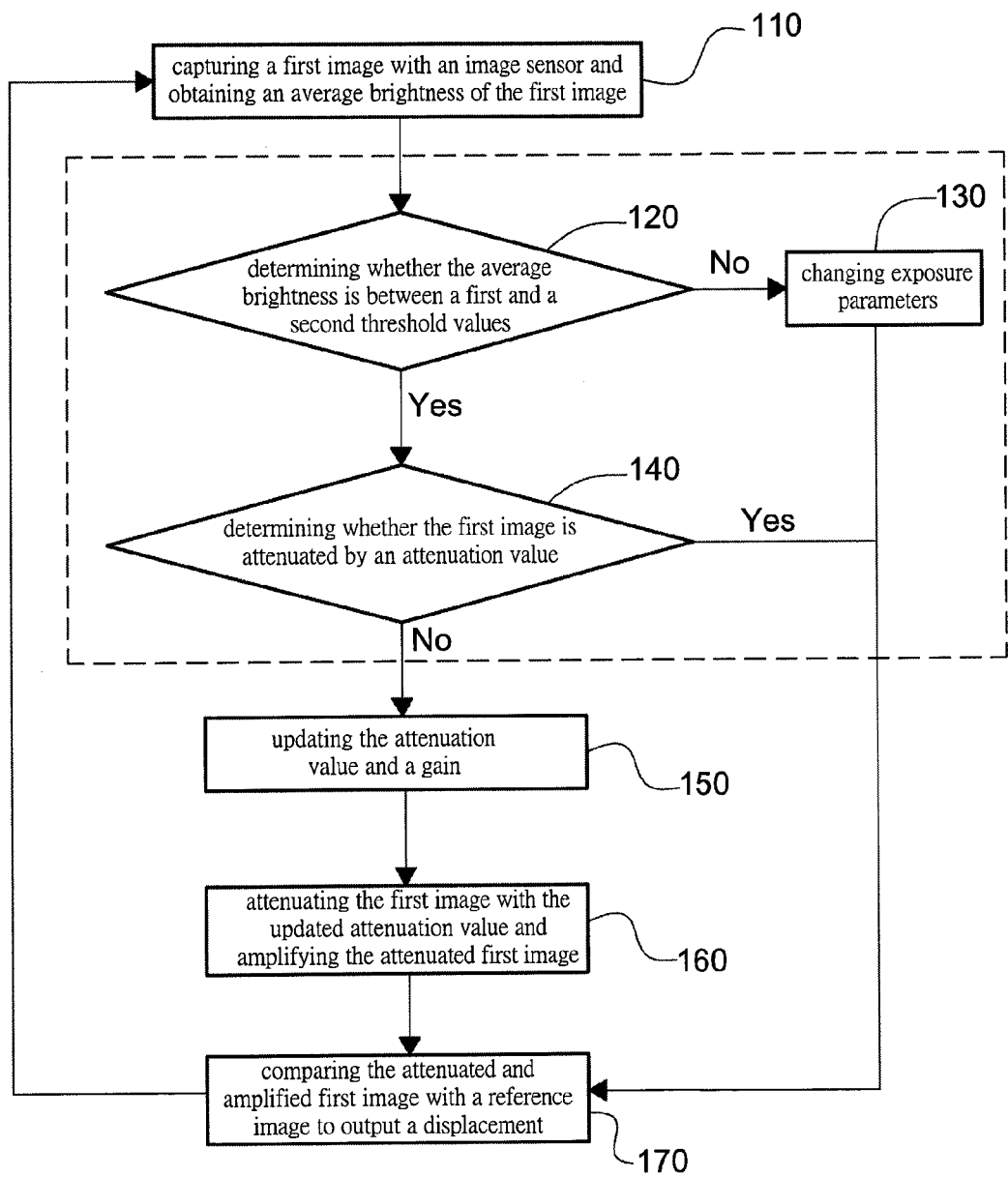
FIG. 5 shows a flow chart of the image processing method of an optical navigator according to one embodiment of the present invention.

Please refer to FIG. 5, it shows a flow chart of the image processing method of an optical navigator according to one embodiment of the present invention. The image processing method includes the steps of: capturing a first image having an average brightness with an image sensor (step 110); determining whether the average brightness is between a first threshold value and a second threshold value (step 120); if not, changing exposure parameters (step 130) and comparing the first image with a reference image to output a displacement (step 170), and then capturing a next image; if the average brightness is between the first and second threshold values, determining whether the first image is attenuated by an attenuation value (step 140); if yes, executing step 170; if, on the contrary, the average brightness is not between the first and second threshold values, updating the attenuation value and a gain (step 150), attenuating the first image with the attenuation value and amplifying the attenuated first image (step 160), and comparing the attenuated and amplified first image with a reference image to output a displacement (step 170), and finally capturing a next image to repeat the above steps.

Please refer to FIGS. 1, 2, 3 and 5, details of the image processing method of an optical navigator according to one embodiment of the present invention will be illustrated hereinafter. Firstly, the image sensor 11 is used to capture a first image, which has an average brightness (e.g. $D_x$), of the work surface "S", wherein the brightness distribution of one row pixels sensed by a sensing array of the image sensor 11 may be shown as FIG. 2a (step 110). Then, the image processing unit 12 determines whether the average brightness is between two threshold values (for example, but not limited to, in a 256 gray level scale, a first threshold value may be 64 and a second threshold value may be 128) (step 120). When the average brightness is not between the two predetermined threshold values, the image processing unit 12 changes exposure parameters, for example changing the lighting intensity and/or lighting frequency of the light source 10, such that the image sensor 11 is able to capture a next image having a brightness between the two predetermined threshold values (step 130). Then, the image processing unit 12 compares the first image and a reference image to obtain a displacement (step 170) and then transmits the displacement to the transmission interface unit 125 for transmitting, wherein the reference image may be an image captured by the image sensor 11 previous to the first image. When the average brightness is between the two predetermined threshold values, the image processing unit 12 determines whether the first image (i.e. the brightness of the first image) is attenuated by an attenuation value (as shown in FIGS. 2 and 3) (step 140). If the average brightness of the first image is attenuated by the attenuation value, the image processing unit 12 directly converts the first image to a digital image and compares the converted first image with a reference image to obtain a displacement (step 170), and the displacement will then be transmitted through the transmission interface unit 125. If the first image is not attenuated by the attenuation value, the image processing unit 12 determines a current attenuation value and a gain according to the first image and updates the attenuation value and the gain obtained according to the image previous to the first image (step 150), wherein the gain may be a linear gain or a non-linear gain. Next, the first image will be attenuated by the updated attenuation value and the attenuated first image will be amplified with the gain (as shown in FIGS. 2 and 3) (step 160), and the attenuated and amplified first image will be digitized by the ADC unit 123, wherein the digitizing process may be linear or non-linear. When the ADC unit 123 is a non-linear ADC unit, step 160 and the gain updating process in step 150 can be omitted. Subsequently, the image processing unit 12 compares the digitized first image and a reference image to obtain a displacement (step 170), and the displacement will then be transmitted by the transmission interface unit 125, wherein the displacement may be obtained, for example, by calculating the correlation between the first image and the reference image. At last, the image sensor 11 captures a new image and the steps 110~170 will be repeated again.

As mentioned above, because conventional exposure control method of an optical navigation device adjusts the exposure control parameter only when an average illumination of images is not within a predetermined range, it is not able to effectively increase the dynamic processability of reflected images from a work surface. The present invention further processes, linearly or non-linearly, images captured by an image sensor (as shown in FIGS. 2 and 3) so as to increase the peak-to-peak value of the characteristic variation of brightness of the image. Therefore, the present invention has the effects of increasing the resolution of the image of a work surface having different reflection intensities and increasing the dynamic processability of reflected images from the work surface.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An image processing method of an optical navigator, the optical navigator capturing images according to exposure parameters, the image processing method comprising the steps of:
   capturing a first image and calculating an average brightness of the first image;
   determining whether the average brightness is between a first threshold value and a second threshold value;
   determining whether the first image is attenuated by an attenuation value when the average brightness is between the first and second threshold values;
   updating the attenuation value and a gain when the first image is not attenuated by the attenuation value;
   attenuating the first image by the updated attenuation value and amplifying the attenuated first image with the gain; and
   comparing the attenuated and amplified first image with a reference image to obtain a displacement.

2. The image processing method as claimed in claim 1, further comprising the steps of:
   changing the exposure parameters of the optical navigator when the average brightness is not between the first and second threshold values; and
   comparing the first image with a reference image to obtain a displacement.

3. The image processing method as claimed in claim 1, further comprising the step of: comparing the first image with a reference image to obtain a displacement when the first image is attenuated by the attenuation value.

4. The image processing method as claimed in claim 1, wherein the reference image is an image previous to the first image captured by the optical navigator.

5. The image processing method as claimed in claim 1, wherein the first threshold value is 64 and the second threshold value is 128 in a 256 gray level scale.

6. The image processing method as claimed in claim 1, further comprising the step of: transmitting the displacement to an image display.

7. The image processing method as claimed in claim 1, wherein in the step of amplifying the attenuated first image with the gain, the gain is a linear gain or a non-linear gain.

8. The image processing method as claimed in claim 1, wherein before the step of comparing the attenuated and amplified first image with a reference image further comprises comprising the step of: digitizing the attenuated and amplified first image before the step of comparing the attenuated and amplified first image with a reference image.

9. The image processing method as claimed in claim 8, wherein the digitizing is linear digitizing or non-linear digitizing.

10. An optical navigator, comprising:
    an image sensor for capturing images of a work surface to form an analog image having an average brightness;
    a DAC unit for generating an attenuation value;
    an adding unit, coupled to the image sensor and the DAC unit, for attenuating the analog image with the attenuation value;
    an amplifier for amplifying the attenuated analog image;
    an ADC unit for digitizing the attenuated and amplified analog image; and
    a digital signal processor for comparing the digitized analog image with a reference image to form a displacement and for controlling the DAC unit to generate the attenuation value, wherein
    the optical navigator is configured to perform an image processing method comprising:
    capturing the analog image and calculating the average brightness;
    determining whether the average brightness is between a first threshold value and a second threshold value;
    determining whether the analog image is attenuated by the attenuation value when the average brightness is between the first and second threshold values;
    updating the attenuation value and the gain when the analog image is not attenuated by the attenuation value;
    attenuating the analog image by the updated attenuation value and amplifying the attenuated analog image with the gain;
    digitizing the attenuated and amplified analog image; and
    comparing the digitized and attenuated and amplified analog image with the reference image to obtain the displacement.

11. The optical navigator as claimed in claim 10, further comprising a transmission interface unit for transmitting the displacement to an image display.

12. The optical navigator as claimed in claim 10, wherein the amplifier is a linear amplifier or a non-linear amplifier.

13. The optical navigator as claimed in claim 10, wherein the ADC unit is a linear ADC unit or a non-linear ADC unit.

14. The optical navigator as claimed in claim 10, further comprising a light source for lighting the work surface.

15. The optical navigator as claimed in claim 10, wherein the reference image is an image previous to the analog image captured by the image sensor.

16. An optical navigator, comprising:
    an image sensor for capturing images of a work surface to form an analog image having an average brightness;
    a DAC unit for generating an attenuation unit;
    an adding unit, coupled to the image sensor and the DAC unit, for attenuating the analog image with the attenuation value;
    a non-linear ADC unit for digitizing the attenuated analog image; and
    a digital signal processor for comparing the digitized analog image with a reference image to form a displacement and for controlling the DAC unit to generate the attenuation value, wherein
    the optical navigator is configured to perform an image processing method comprising:
    capturing the analog image and calculating the average brightness;
    determining whether the average brightness is between a first threshold value and a second threshold value;
    determining whether the analog image is attenuated by the attenuation value when the average brightness is between the first and second threshold values;
    updating the attenuation value when the analog image is not attenuated by the attenuation value:
    attenuating the analog image by the updated attenuation value and digitizing the attenuated analog image; and
    comparing the attenuated and digitized analog image with the reference image to obtain the displacement.

17. The optical navigator as claimed in claim 16, furthering comprising a transmission interface unit for transmitting the displacement to an image display.

18. The optical navigator as claimed in claim 16, further comprising a light source for lighting the work surface.

19. The optical navigator as claimed in claim 16, wherein the reference image is an image previous to the analog image captured by the image sensor.

* * * * *